June 22, 1965 L. K. MOONEY 3,191,073
THRESHOLD INDICATOR
Filed March 14, 1963
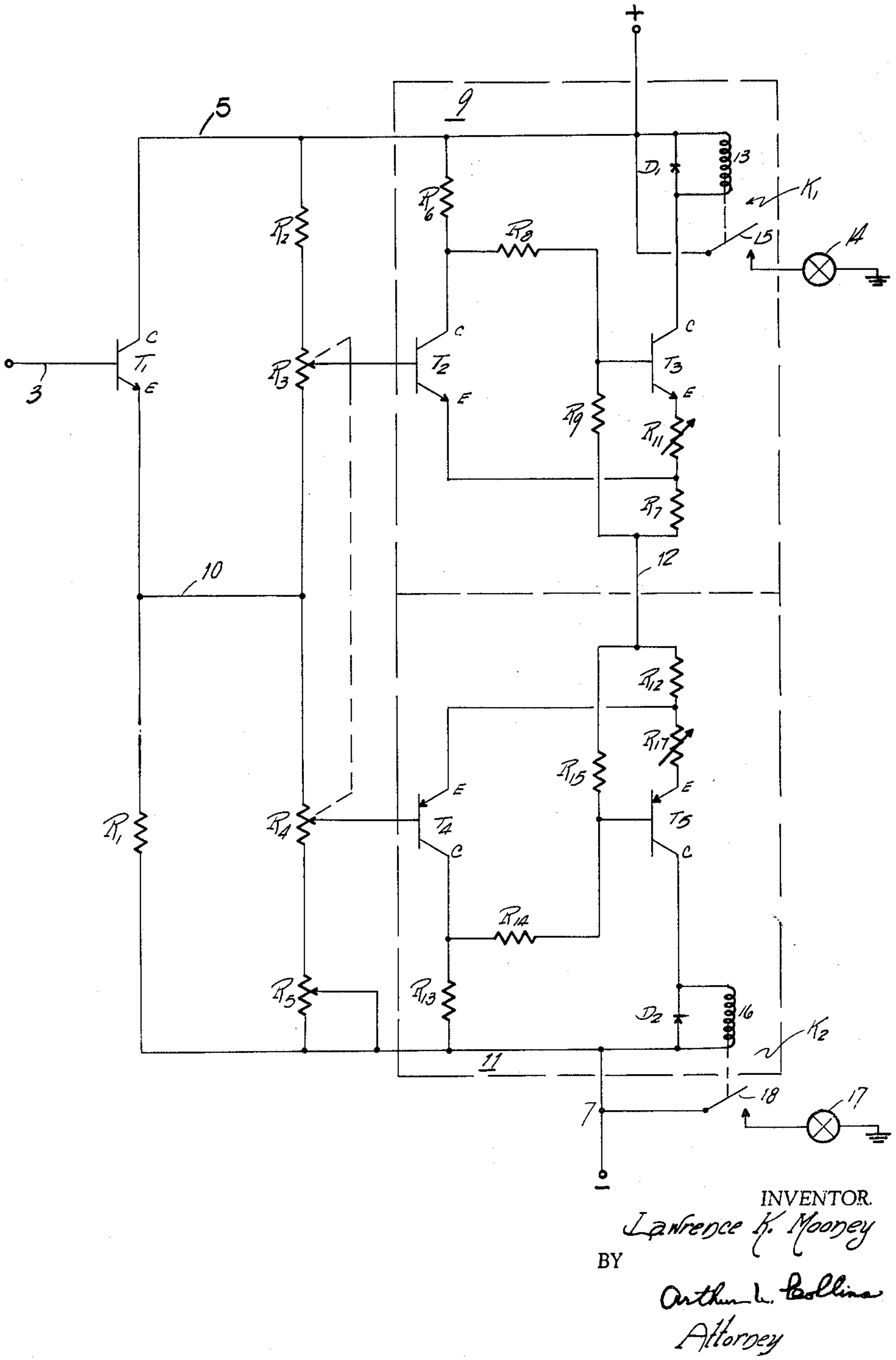
INVENTOR.
Lawrence K. Mooney
BY
Arthur L. Collins
Attorney United States Patent Office 3,191,073
Patented June 22, 1965

3,191,073
THRESHOLD INDICATOR

Lawrence K. Mooney, Alexandria, Va., assignor, by mesne assignments, to the United States of America as represented by the Secretary of the Navy Filed Mar. 14, 1963, Ser. No. 265,296
5 Claims. (Cl. 307—88.5)

The present invention relates to novel and improved electrical detection apparatus and more particularly to novel and improved apparatus of high sensitivity for monitoring a variable input signal for the detection of a predetermined threshold potential.

Various types of conventional trigger circuits are often used to indicate receipt of a signal having a potential in excess of a predetermined threshold level. One circuit, which is commonly used for this purpose, is known as the Schmitt trigger circuit which is a regenerative bistable circuit whose state depends upon the amplitude of the input signal. Due, however, to a phenomenon known as hysteresis whereby the potential at which triggering occurs depends upon whether the input voltage is increasing or decreasing as it crosses the threshold potential, considerable difficulty has been experienced in the past in monitoring variable direct current voltages. Moreover, conventional threshold detection circuits devised in the past have been incapable of detecting signals of either polarity in excess of the predetermined threshold value.

It is therefore a principal object of the present invention to provide a novel and improved triggering circuit which monitors input signals which vary at random in polarity and in potential above and below a predetermined threshold potential.

It is a further object of the present invention to provide novel and improved highly sensitive threshold detection circuitry which minimizes hysteresis or backlash as the input signal varies about the threshold potential.

Other objects and many of the attendant advantages of this invention will be readily appreciated as the same becomes better understood by reference to the following detailed description when considering in connection with the accompanying drawing wherein:

The single figure of the drawing is a diagrammatic view of a preferred embodiment of the present invention.

As shown in the drawing, the variable direct current input voltage is coupled to the base of transistor $T_1$ through input conductor 3. The collector-emitter circuit of NPN transistor $T_1$ extends from the positive direct current voltage supply line 5 through transistor $T_1$ and through resistor $R_1$ to the negative direct current voltage supply line 7. The positive and negative voltage supply lines 5 and 7 are also interconnected by the voltage divider circuit that includes the series connected resistor $R_2$, potentiometer $R_3$, potentiometer $R_4$, and rheostat $R_5$. The junction of the emitter of transistor $T_1$ with resistor $R_1$ is coupled at 10 as shown to the junction of potentiometers $R_3$ and $R_4$. The variable arms of potentiometers $R_3$ and $R_4$, which are mechanically ganged together, are respectively coupled to the bases of transistors $T_2$ and $T_4$. Potentiometers $R_3$ and $R_4$ are preferably of a vernier heliopot design and as will be more apparent hereinafter thereby permit highly accurate adjustment of the desired threshold level. The collector-emitter circuit of the NPN transistor $T_2$ in the Schmitt trigger circuit 9 extends from the positive voltage supply line 5 through resistor $R_6$, through transistor $T_2$ and through resistor $R_7$ to its junction 12 with the Schmitt trigger circuit 11. The collector of transistor $T_2$ is coupled to the base of the NPN transistor $T_3$ through the resistor $R_8$ and resistor $R_9$. The collector-emitter circuit of the NPN transistor $T_3$ extends from the positive voltage supply line 5 through the parallel arrangement of diode $D_1$ and the energizing coil 13 of relay $K_1$, through transistor $T_3$ and through resistors $R_{11}$ and $R_7$ to the junction 12 with the Schmitt trigger circuit 11. Lamp 14, which indicates the condition of energization of the emitter-collector circuit of transistor $T_3$, is energized by a circuit that extends from the power supply line 5 through contact 15 of relay $K_1$ and through the lamp to ground. The emitter-collector circuit of the PNP transistor $T_4$ in the Schmitt trigger circuit 11 extends from its junction with the Schmitt trigger circuit 9 through resistor $R_{12}$, through transistor $T_4$ and through resistor $R_{13}$ to the negative voltage supply line 7. The collector of transistor $T_4$ is coupled to the base of transistor $T_5$ through the resistor $R_{14}$ and resistor $R_{15}$. The emitter-collector circuit of the PNP transistor $T_5$ extends from its junction with the Schmitt trigger circuit 9 through resistor $R_{12}$, and resistor $R_{17}$ through transistor $T_5$ and through the parallel arrangement of diode $D_2$ and the energizing coil 16 of relay $K_2$ to the negative voltage supply line 7. Lamp 17 which indicates the condition of energization of the emitter-collector circuit of transistor $T_5$ is energized by a circuit that extends from the power supply line 7 through contact 18 of relay $K_2$ and through the lamp to ground.

In operation the variable resistor or rheostat $R_5$ is first adjusted such that the junction of potentiometers $R_3$ and $R_4$ at 10 is set at ground potential. Due to the choice of magnitude of various parameters of the circuit, the junction of Schmitt circuits 9 and 11 at 12 is also fixed at ground potential. Ganged potentiometers $R_3$ and $R_4$ are then simultaneously adjusted such that the cascaded Schmitt trigger circuits 9 and 11 fire at desired preset respective positive and negative input potentials in a manner which is described more fully hereinafter. The variable direct current signal which is to be monitored and detected at the preset threshold potential is then coupled to the base of the emitter follower circuit of transistor $T_1$ through input line 3. The high input impedance of the emitter follower circuit of transistor $T_1$ serves to minimize loading of the circuit that generates the threshold signal. Unitil the potential of the input signal on conductor 3 reaches or exceeds the preset threshold potential, the flow of current from the positive voltage supply line 5 successively through resistors $R_6$, $R_7$ and $R_9$ to junction point 12 establishes a positive potential and a forward bias on the base of transistor $T_3$. The collector-emitter circuit of transistor $T_3$ therefore conducts current, the coil 13 of relay $K_1$ is energized and lamp 14 is deenergized. The flow of current through resistor $R_7$ develops a positive potential at the emitter of the transistor $T_2$ that exceeds the positive potential at the variable arm of potentiometer $R_3$. This establishes a normal reverse bias across the base-emitter circuit of transistor $T_2$ and maintains transistor $T_2$ in a normal cut-off condition. In a similar manner, before the input signal on conductor 3 reaches or exceeds the preset threshold potential, the flow of current from the negative voltage supply line 7 successively through resistors $R_{13}$, $R_{14}$ and $R_{15}$ to junction point 12 establishes a negative potential and a forward bias on the base of transistor $T_5$. The collector-emitter circuit of transistor $T_5$ therefore conducts current, coil 16 of relay $K_2$ is energized and lamp 17 is deenergized. The flow of current through resistor $R_{12}$ develops a negative potential at the emitter of transistor $T_4$ that exceeds the negative potential at the variable arm of potentiometer $R_4$. This establishes a normal reverse bias across the base-emitter circuit of transistor $T_4$ and maintains transistor $T_4$ in a normal cut-off condition. When the input signal on line 3 is positive in polarity and exceeds the preset threshold potential in magnitude, a positive pulse is applied to the base of the normally cut-off transistor $T_2$. This provides a forward bias across transistor $T_2$ and energizes its emitter-collector circuit. When this occurs, the resulting drop in potential at the collector of transistor $T_2$ is transmitted to the base of transistor $T_3$ and transistor $T_3$ is cut off. This deenergizes the coil of relay $K_1$ and energizes the lamp 14 through contact 15 of the relay. When the potential of the input signal subsequently falls below the preset threshold potential, transistor $T_2$ deenergizes, transistor $T_3$ conducts again, relay $K_1$ is reenergized and lamp 14 is again deenergized.

Similarly, when the input signal on line 3 is negative in polarity and exceeds the preset threshold potential in magnitude, a negative pulse is applied to the base of the normally cut-off transistor $T_4$. This provides a forward bias across transistor $T_4$ and energizes its emitter-collector circuit. When this occurs, the resulting decrease in potential at the collector of transistor $T_4$ is transmitted to the base of transistor $T_5$ and transistor $T_5$ is cut off. This deenergizes the coil of relay $K_2$ and energizes the lamp 17 through contact 18 of the relay. When the negative potential of the input signal falls below the preset threshold potential, transistor $T_4$ deenergizes, transistor $T_5$ conducts again, relay $K_2$ is reenergized and lamp 17 is again deenergized.

The presence of resistors $R_{11}$ and $R_{17}$ in the emitter circuits of transistors $T_3$ and $T_5$ respectively minimizes the hysteresis or backlash effect in the Schmitt trigger circuits 9 and 11.

Obviously many modifications and variations of the present invention are possible in the light of the above teachings. It is therefore to be understood that within the scope of the appended claims the invention may be practiced otherwise than as specifically described.

What is claimed is:

1. Threshold detection apparatus for monitoring a direct current input signal of any amplitude between predetermined positive and negative potentials, said apparatus comprising:

(a) a first Schmitt trigger circuit including a pair of NPN transistors, one of the NPN transistors of said trigger circuit being normally energized and being deenergized when a predetermined positive potential is applied to the base of the other NPN transistor;

(b) a first indicator device;

(c) means for coupling the first indicator device to the collector circuit of the said one NPN transistor of the first Schmitt trigger circuit;

(d) a second Schmitt trigger circuit including a pair of PNP transistors, one of the PNP transistors of said second trigger circuit being normally energized and being deenergized when a predetermined negative potential is applied to the base of the other PNP transistor;

(e) a second indicator device;

(f) means for coupling the second indicator device to the collector circuit of the said one PNP transistor of the second Schmitt trigger circuit;

(g) a positive D.C. potential source;

(h) a negative D.C. potential source;

(i) a voltage divider network which is connected across said positive and negative potential sources and which includes a pair of series connected potentiometers;

(j) means connecting the variable arm of one of the potentiometers to the base of the said other NPN transistor;

(k) means connecting the variable arm of the other potentiometer to the base of the said other PNP transistor;

(l) and means coupling the input signal to be monitored to the junction of the series connected potentiometers.

2. The apparatus set forth in claim 1 wherein each Schmitt trigger circuit includes means for minimizing its hysteresis effect.

3. The apparatus set forth in claim 1 wherein the variable arms of the potentiometers are mechanically ganged together.

4. The apparatus set forth in claim 1 and further comprising means for maintaining the potential at the junction of the series connected potentiometers substantially at ground when no input signal is present.

5. The apparatus set forth in claim 1 and further comprising an emitter follower coupled between the voltage divider network and the input signal.

References Cited by the Examiner

UNITED STATES PATENTS

| | | | |
|---|---|---|---|
| 2,911,545 | 11/59 | Pinckaers | 307—88.5 |
| 2,985,774 | 5/61 | Carbone et al. | 307—88.5 |
| 3,099,000 | 7/63 | Dunning | 307—88.5 X |
| 3,117,238 | 1/64 | McNair | 307—88.5 |

JOHN W. HUCKERT, *Primary Examiner.*

ARTHUR GAUSS, *Examiner.*